US009685086B2

(12) United States Patent
Zhang et al.

(10) Patent No.: US 9,685,086 B2
(45) Date of Patent: Jun. 20, 2017

(54) POWER CONSERVATION IN TRAFFIC SAFETY APPLICATIONS

(71) Applicant: Cisco Technology, Inc., San Jose, CA (US)

(72) Inventors: Tao Zhang, Fort Lee, NJ (US); Helder F. Antunes, Morgan Hill, CA (US)

(73) Assignee: Cisco Technology, Inc., San Jose, CA (US)

( * ) Notice: Subject to any disclaimer, the term of this patent is extended or adjusted under 35 U.S.C. 154(b) by 97 days.

(21) Appl. No.: 14/722,258

(22) Filed: May 27, 2015

(65) Prior Publication Data

US 2016/0351054 A1 Dec. 1, 2016

(51) Int. Cl.
*H04W 52/02* (2009.01)
*H04W 4/02* (2009.01)
*H04W 72/00* (2009.01)
*G08G 1/16* (2006.01)
*G01S 19/13* (2010.01)

(52) U.S. Cl.
CPC .............. *G08G 1/161* (2013.01); *G01S 19/13* (2013.01); *H04W 4/028* (2013.01); *H04W 52/0225* (2013.01); *H04W 52/0248* (2013.01); *H04W 72/005* (2013.01)

(58) Field of Classification Search
CPC ....... G08G 1/161; G01S 19/13; H04W 4/028; H04W 52/0225; H04W 52/0248; H04W 72/005
See application file for complete search history.

(56) References Cited

U.S. PATENT DOCUMENTS

| 5,636,123 A | 6/1997 | Rich et al. |
| 6,502,034 B1 | 12/2002 | Miller |
| 8,175,796 B1 | 5/2012 | Blackburn et al. |
| 2005/0073438 A1* | 4/2005 | Rodgers ................. G08G 1/166 340/944 |
| 2006/0119473 A1* | 6/2006 | Gunderson ............ B60Q 9/006 340/435 |
| 2007/0160006 A1* | 7/2007 | Roggero ........... G08G 1/096775 370/331 |
| 2007/0244643 A1* | 10/2007 | Tengler .................. G08G 1/161 701/301 |
| 2011/0046843 A1* | 2/2011 | Caveney ................ G08G 1/161 701/31.4 |

(Continued)

OTHER PUBLICATIONS

Dr. Chris Borroni-Bird "Enabling Connected and Electric Vehicles", Qualcomm Technologies, Inc., 2013, pp. 1-19.

(Continued)

*Primary Examiner* — Rodney Butler
(74) *Attorney, Agent, or Firm* — Parker Ibrahim & Berg LLC; James M. Behmke; Stephen D. LeBarron (57) ABSTRACT

In one embodiment, a device sends collision avoidance safety messages to prevent potential collisions between vehicles and the portable electronic device. The device determines whether a current or predicted future location of the device intersects an action zone. An action zone corresponds to a geographic area in which a potential collision may occur between a vehicle and the device. The device adjusts a broadcast rate for the collision avoidance safety messages based on whether the device determines that the current or predicted future location of the device intersects an action zone.

20 Claims, 6 Drawing Sheets

(56) References Cited

U.S. PATENT DOCUMENTS

| | | | | |
|---|---|---|---|---|
| 2013/0210460 A1* | 8/2013 | Subramanian | ...... | B61L 15/0027 |
| | | | | 455/456.3 |
| 2013/0293394 A1* | 11/2013 | Rubin | ...... | G08G 9/02 |
| | | | | 340/902 |
| 2013/0336120 A1* | 12/2013 | Bai | ...... | G08G 1/161 |
| | | | | 370/235 |
| 2014/0045556 A1* | 2/2014 | Subramanian | .... | H04W 52/0251 |
| | | | | 455/574 |
| 2014/0328241 A1* | 11/2014 | Subramanian | ...... | H04W 72/005 |
| | | | | 370/312 |
| 2015/0005981 A1* | 1/2015 | Grimm | ...... | G07C 5/008 |
| | | | | 701/1 |

OTHER PUBLICATIONS

GM News "GM Develops Mobile Technology That Watches Road Ahead", Portable Devices debut at Intelligent Transport Systems World Congress, Oct. 17, 2011, pp. 1-2.

Honda—The Power of Dreams "Honda Demostrates Advanced Vehicle-to-Pedestrian and Vehicle-to-Motorcycle Safety Technologies", Aug. 28, 2013, pp. 1-2.

Sundar Subramanian "Cooperative ITS for all: Enabling DSRC in mobile devices", Qualcomm Research, Feb. 6, 2013, pp. 1-9.

* cited by examiner

POWER CONSERVATION IN TRAFFIC SAFETY APPLICATIONS

TECHNICAL FIELD

The present disclosure relates generally to traffic safety applications and, more particularly, to power conservation techniques for traffic safety applications.

BACKGROUND

In recent years, collision avoidance has emerged as a growing field of interest. Generally speaking, vehicle collision avoidance systems may use information regarding the surroundings of a vehicle (e.g., an automobile, etc.), to detect potential vehicle collisions before they occur. In some cases, a vehicle collision avoidance system may automatically trigger an action by the vehicle, if a collision is imminent. For example, the collision avoidance system may activate the brakes of the vehicle or take other measures, to help eliminate or mitigate the potential collision between vehicles. In other cases, the vehicle collision avoidance system may provide alerts to the operator of the vehicle, when a potential collision is detected.

Dedicated short range radio (DSRC) illustrates one enabling technology that may be used as part of a vehicle collision avoidance system. Notably, the United States Federal Communications Commission has recently allocated the 5.9 GHz band for use by intelligent transportation systems. For example, a vehicle collision avoidance system equipped with a DSRC transceiver may broadcast safety messages at certain times, to alert other vehicles as to the location, speed, and/or direction of travel of the vehicle. In response to receiving such information from another vehicle, the vehicle collision avoidance system may detect potential hazards by comparing the location, speed, and/or direction of the local vehicle to those of any nearby vehicles.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

According to one or more embodiments of the disclosure, a device sends collision avoidance safety messages to prevent potential collisions between vehicles and the portable electronic device. The device determines whether a current or predicted future location of the device intersects an action zone. An action zone corresponds to a geographic area in which a potential collision may occur between a vehicle and the device. The device adjusts a broadcast rate for the collision avoidance safety messages based on whether the device determines that the current or predicted future location of the device intersects an action zone.

DESCRIPTION

As described herein, power conservation techniques are disclosed that allow for portable electronic devices (e.g., smart phones, wearable devices, etc.) to perform collision avoidance functions, while conserving battery power. In some aspects, a portable electronic device may use stochastic modeling to dynamically predict when and how frequently the device should broadcast safety messages. Correspondingly, the device may be configured to power down its safety message radio transceiver and/or location-determining mechanism, when safety messages are not needed, to conserve power. In further aspects, a portable electronic device may use one or more safety messages received from a collision avoidance system of a vehicle to warn the user of the portable electronic device of any potential collisions between the user and the vehicle.

Figure 1:
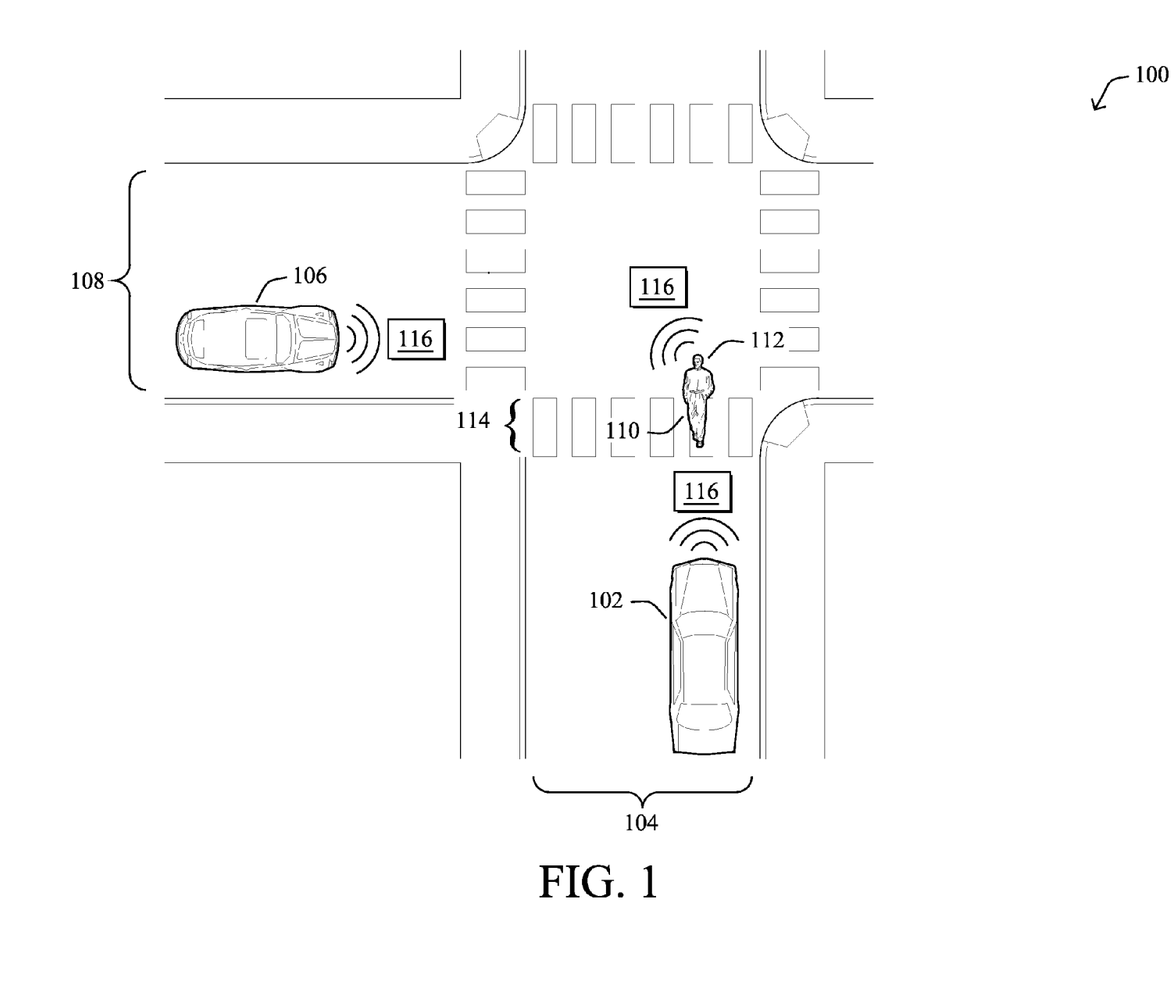
FIG. 1 illustrates an example network of communicating devices.

Referring now to FIG. 1, an example network of communicating devices is shown, according to various embodiments. As shown, network 100 may include vehicle collision avoidance systems/devices on board a first vehicle 102 and a second vehicle 106. In general, the collision avoidance systems/devices of vehicles 102 and 106 may be operable to broadcast safety messages 116 within a certain range of each vehicle, to alert any nearby vehicles as to the location, speed, and/or direction of travel of the sending vehicle.

To determine the current location of the vehicle, the collision avoidance systems/devices of each of vehicles 102 and 106 may be equipped with a global positioning system (GPS) receiver or other location-determining mechanism (e.g., using cellular triangulation, etc.). In some embodiments, the device/system may use the location information to determine the speed and/or direction of movement of the local vehicle. For example, the collision avoidance system/device of vehicle 106 may determine the speed of vehicle 106 based on a difference in GPS coordinates over time. In other cases, the system/device may determine the speed or direction of travel based on information from other systems of the vehicle, such as the speedometer of the vehicle, sensors on the vehicle (e.g., a camera, an accelerometer, etc.), or the like.

In one embodiment, the vehicle collision avoidance systems/devices may use map data to further enhance the information regarding the local vehicle. For example, assume that vehicle 102 is approaching a bend in the road. In such a case, the system/device may predict that the future location and direction of travel of vehicle 102 will be along a different heading than the current heading of vehicle 102. Such map data may be received wirelessly at the local vehicle or may be stored beforehand by the vehicle, in various cases.

The collision avoidance systems/devices of vehicles 102, 106 may broadcast safety messages 116 via local radio transceivers. In one embodiment, safety messages 116 may be dedicated short range radio (DSRC) messages sent in the 5.9 GHz band. Other frequencies may also be used to communicate collision avoidance safety messages, in other embodiments.

In response to receiving a safety message 116, the local vehicle collision avoidance system/device of vehicles 102, 106 may compare the information included in the received message to information regarding the local vehicle, to determine whether the potential for a collision exists. Notably, the local collision avoidance system of the vehicle may compare the predicted future location of any nearby vehicles to the predicted further location of the local vehicle, to determine whether there is any potential for spatial overlap. The predicted future location of the remote vehicle may be included in safety message 116 or, alternatively, be derived therefrom by the local vehicle.

In one example, consider the scenario shown in FIG. 1 whereby vehicle 102 is traveling along a roadway 104 that runs perpendicular to roadway 108 on which vehicle 106 is traveling. Based on safety messages 116, the collision avoidance systems/devices of vehicles 102, 106 may determine whether a geographic region exists in which a potential collision may occur (e.g., a zone of possible, likely, or imminent collision) with respect to the local vehicle. For example, if vehicles 102 and 106 are predicted to both be located within the intersection of roadways 104 and 108 within a certain time frame, the collision avoidance systems/devices may determine that a collision is possible and/or the associated threat level.

In response to detecting a potential collision, the collision avoidance systems/devices of vehicles 102, 106 may take any number of measures to help avoid such a collision. For example, in one case, the local system/device may issue an alert to the driver regarding the potential collision (e.g., as a noise, an icon on a display, etc.). In other cases, the system/device may perform some level of control over the local vehicle, in response to detecting a potential collision. For example, the system/device may cause the brakes of the vehicle to engage, may redirect the vehicle along a different path, or take other such measures, to ensure that the risk of collision is mitigated.

According to various embodiments, portable electronic device 112 carried by user 110 may also be configured to function as a collision avoidance system/device, similar to the collision avoidance systems/devices of vehicles 102, 106. For example, portable electronic device 112 may be operable to broadcast safety messages 116 that indicate the locations, speeds, directions of travel, etc. of user 110 and/or device 112. Similarly, portable electronic device 112 may also be operable to receive safety messages 116 from vehicles 102 and 106 regarding the respective locations, speeds, directions of travel, etc. of the vehicles, to determine whether any potential collisions may exist between user 110 and vehicles 102, 106.

In the context of a portable electronic device, portable electronic device 112 may be operable to identify action zones, in various embodiments. Generally speaking, an action zone corresponds to any geographic region in which portable electronic device 112 should perform collision avoidance functions. For example, as shown, crosswalk 114 that intersects roadway 104, roadway 104 itself, and/or roadway 108 may be action zones, since moving vehicles are presumed to traverse these regions. However, a building located along the side of roadway 104 may not be an action zone, as it is presumed that no vehicle collisions will occur within the building. In other cases, an action zone may also include a predefined area surrounding the roadway or other vehicle thruway (e.g., x-number of meters from the street, etc.).

In one example of operation, assume that user 110 is in the process of stepping into crosswalk 114. In such a case, safety messages 116 may cause portable electronic device 112 to evaluate whether a potential for collision exists between user 110 and any nearby vehicles, such as vehicle 102. For example, if vehicle 102 is stopped at the intersection of roadways 104 and 108, portable electronic device 112 may determine that a collision between vehicle 102 and user 110 is less likely to occur. However, if vehicle 102 is still approaching the intersection of roadways 104 and 108 at a constant speed when user 110 steps into roadway 104, portable electronic device 112 may determine that there is the potential for a collision between vehicle 102 and user 110. In such a case, portable electronic device 112 may take any number of actions to prevent the potential collision, such as issuing an alert to user 110.

In response to receiving a safety message 116 from portable electronic device 112, the collision avoidance system/device of vehicle 102 may also take any number of collision avoidance measures, to avoid a collision with user 110. For example, if a safety message 116 from portable electronic device 112 indicates that user 110 will be located in crosswalk 114 at or around the same time as vehicle 102, the collision avoidance system/device of vehicle 102 may alert the driver of vehicle 102, attempt to stop vehicle 102, or take any number of other collision avoidance measures, based on the likelihood of collision between vehicle 102 and user 110.

While the inclusion of collision avoidance features on portable electronic devices promises enhanced safety for pedestrians, bicyclists, and other roadway users, certain challenges exist over that of on-board vehicle collision systems. Notably, while vehicles are typically capable of generating electrical power (e.g., via an alternator, etc.), most portable electronic devices do not have such a mechanism. Thus, the amount of electrical power available to a portable electronic device may be limited before additional charging of the device is needed. Configuring the portable device to include collision avoidance features may further deplete the stored power of the device, as additional power may be consumed to transmit safety messages, determine the location of the device, and perform any other operations associated with collision avoidance.

Figure 2:
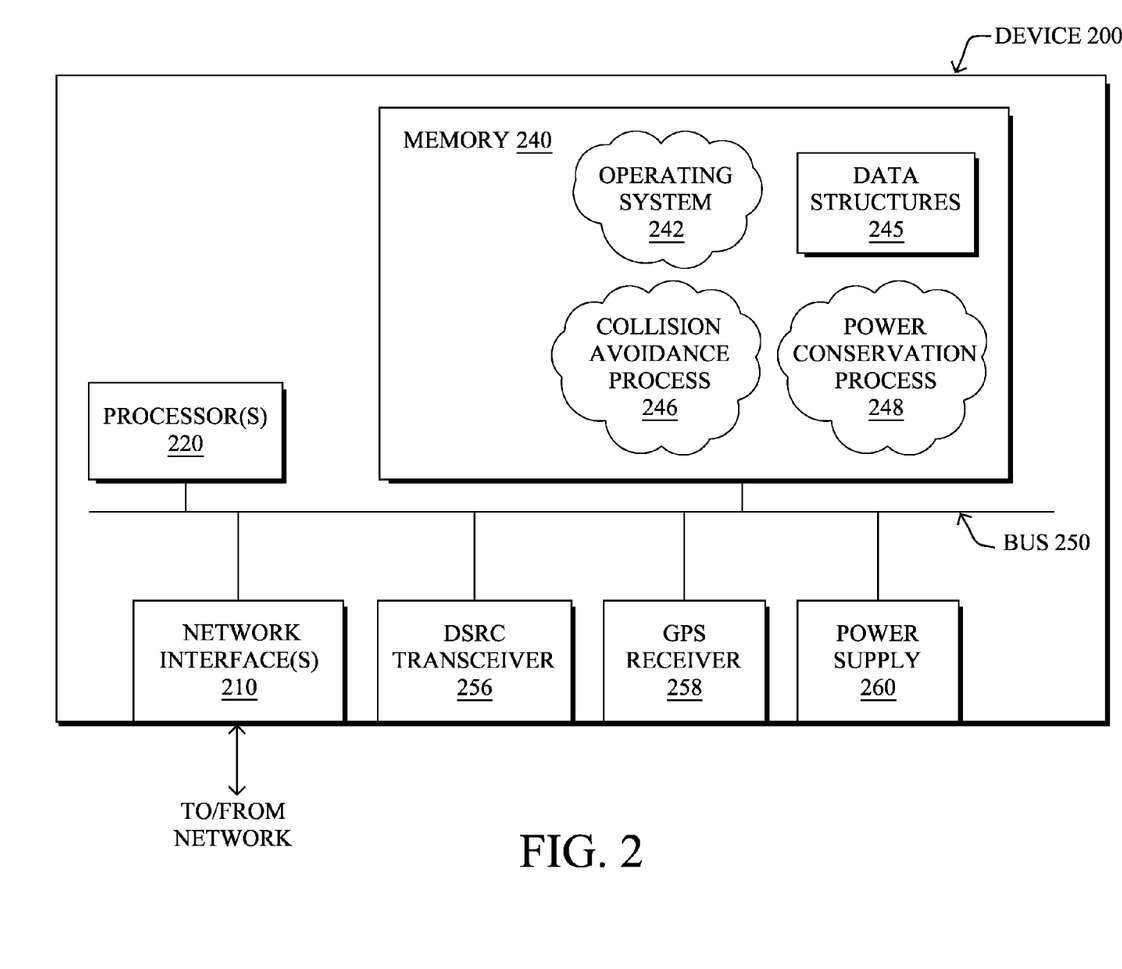
FIG. 2 illustrates an example device/node.

Referring now to FIG. 2, an example electronic device 200 is shown that may be used with one or more embodiments described herein, e.g., as any of the devices described with respect to FIG. 1 above (e.g., portable electronic device 112, the collision avoidance systems/devices of vehicles 102, 106, etc.). Generally, device 200 may comprise one or more network interfaces 210 (e.g., wired, wireless, etc.), a DSRC transceiver 256, a GPS receiver 258, at least one processor 220, and a memory 240 interconnected by a system bus 250, as well as a power supply 260 (e.g., battery, etc.).

The network interface(s) 210 include the mechanical, electrical, and signaling circuitry for providing a data connection between device 200 and a data network, such as the Internet. For example, interfaces 210 may include cellular transceivers, WiFi transceivers, or the like, to allow device 200 to request and/or receive information from a remote computing device or server.

The memory 240 comprises a plurality of storage locations that are addressable by the processor 220, the network interfaces 210, DSRC transceiver 256, and/or GPS receiver 258, for storing software programs and data structures associated with the embodiments described herein. The processor 220 may comprise hardware elements or hardware logic adapted to execute the software programs and manipulate the data structures 245. An operating system 242, portions of which are typically resident in memory 240 and executed by processor 220, functionally organizes device 200 by, inter alia, invoking operations in support of software processes and/or services executing on the device. These software processes and/or services may comprise a collision avoidance process 246 and/or an illustrative power conservation process 248, as described herein.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

In general, DSRC transceiver 256 may be operable to receive and/or transmit collision avoidance safety messages to and from device 200 and one or more other nearby devices. For example, DSRC transceiver 256 may operate in the 5.9 GHz band to communicate between device 200 and the collision avoidance systems/device of any nearby vehicles. In other embodiments, transceiver 256 may be configured to operate on different frequencies.

In some embodiments, device 200 includes a GPS receiver 258 that receives location information from a plurality of satellites that are part of a GPS network. In other embodiments, device 200 may employ other techniques to determine the location of device 200. For example, in another embodiment, device 200 may use cellular positioning based on information from a cellular interface 210, to determine the location of device 200, in addition to, or in lieu of, data from GPS receiver 258.

Collision avoidance process 246 when executed by processor(s) 220, causes device 200 to perform the various collision avoidance functions described herein. In some embodiments, collision avoidance process 246 may determine the location, speed of travel, and/or direction of travel of device 200 based on data received from GPS receiver 258, network interface(s) 210, etc. For example, collision avoidance process 246 may analyze location information from GPS receiver 258 over time, to determine the speed and direction of travel of device 200. In other words, collision avoidance system 246 may determine any information that may indicate the future location of device 200. In some cases, collision avoidance process 246 may also consider map data received from network interfaces 210 and/or stored in data structures 245, to indicate the future location of device 200.

Collision avoidance process 246 may include any information indicative of the future location of device 200 within one or more safety messages (e.g., safety messages 116) broadcast to the nearby area surrounding device 200 via DSRC transceiver 256. Conversely, collision avoidance process 246 may also receive safety messages from any nearby vehicles or devices indicative of the future locations of the vehicles or devices. In response, collision avoidance process 246 may compare the information indicative of the future location of device 200 with the future location(s) of the nearby vehicles or other devices, to determine whether a threat exists and, if so, which collision avoidance actions are to be taken (e.g., by providing an alert to a screen, speaker, etc. of device 200, etc.).

In various embodiments, power conservation process 248 may oversee the power conservation measures taken with respect to collision avoidance process 246. As would be appreciated, processes 246-248 may be separate processes that operate in conjunction with one another or a single process that includes the functionalities of both processes. In general, power conservation process 248 is operable to determine when, and for how long, the components of device 200 should perform collision avoidance functions. For example, power conservation process 248 may control when DSRC transceiver 256 and/or GPS receiver 258 are powered, to support collision avoidance process 246 (e.g., to transmit safety messages, determine the location of device 200, etc.). In another example, power conservation process 248 may control when safety messages are to be broadcast by device 200 via DSRC transceiver 256.

In some embodiments, device 200 may perform some or all of the techniques herein using cloud-based services, to reduce the software complexity and processing load on device 200. In such cases, process 246 and/or process 248 may communicate remotely with a cloud-based service, to perform its respective functions. For example, processes 246, 248 may send its current location, direction of travel, and speed to a cloud-based service to perform the predictions on behalf of device 200. In turn, device 200 may receive prediction information from the cloud-based service and use the predictions for purposes of taking power saving measures. In one embodiment, power conservation process 248 may be operable to select whether a particular calculation should be made locally by device 200 or using a cloud-based service, based on a comparison between the power that would be consumed were the calculation performed locally versus the power that would be consumed communicating with the cloud-based service.

Figure 3:
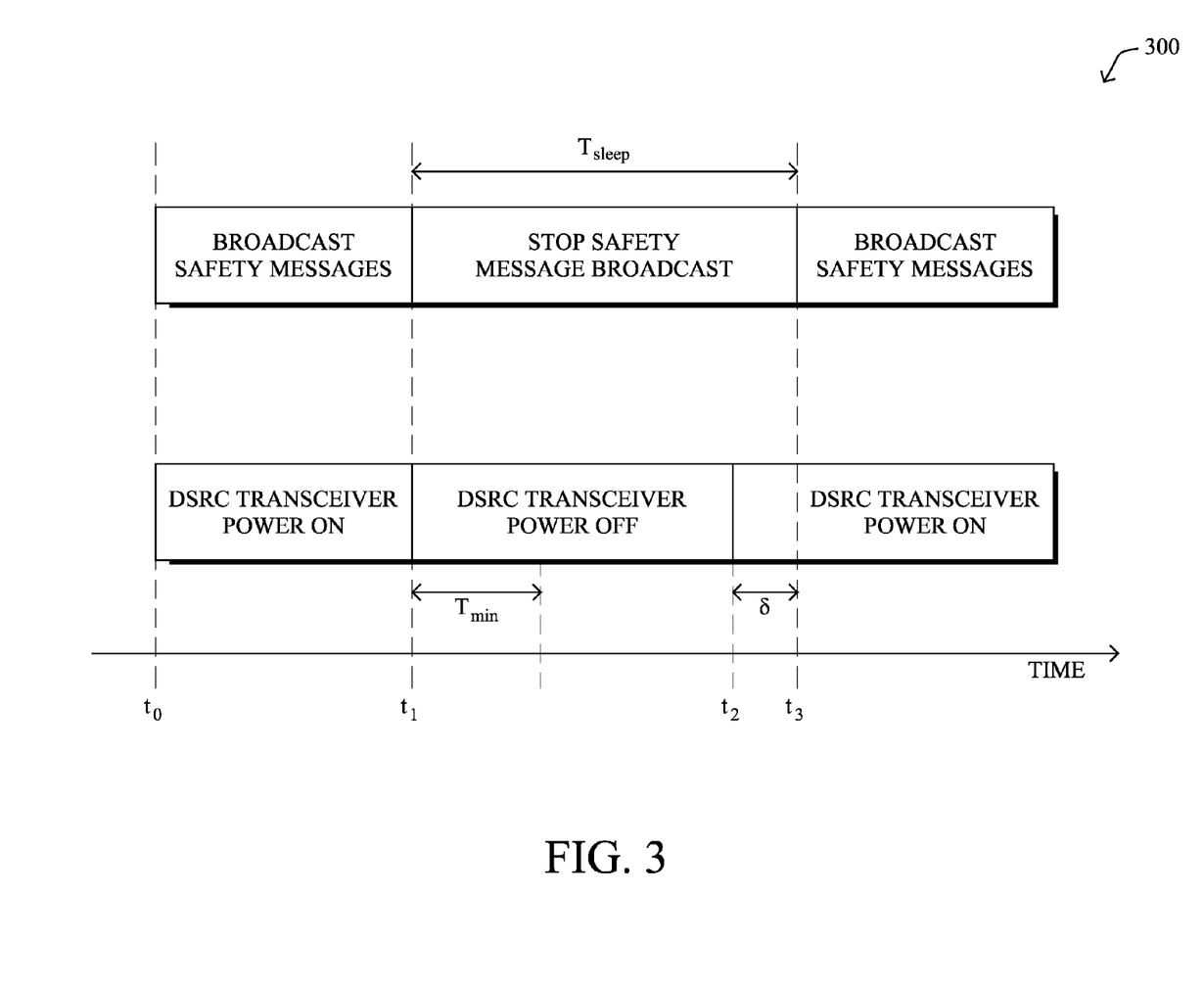
FIG. 3 illustrates an example broadcast window for safety messages.

Referring now to FIG. 3, an example broadcast window for safety messages is shown, according to various embodiments. As shown along timeline 300, device 200 may broadcast one or more safety messages until a time $T=t_1$. Correspondingly, until time $T=t_1$, device 200 may continue to power its DSRC transceiver 256. However, beginning at time $T=t_1$, device 200 may enter into a sleep mode with respect to its collision avoidance functions for a period of time $T_{sleep}=t_3-t_1$. At time $T=t_3$, device 200 may resume sending safety messages, thereby conserving power by not sending safety messages at its maximum broadcast rate.

In some embodiments, device 200 may power off DSRC transceiver 256 during a least a portion of the sleep window. In such a case, device 200 may power back on DSRC transceiver 256, prior to sending one or more new safety messages. For example, assume that DSRC transceiver 256 requires an amount of time $\Delta T=\delta$ or greater, to power up before being able to transmit a safety message again. In such a case, device 200 may determine an appropriate amount of time for DSRC transceiver 256 to be powered off (e.g., from time $T=t_1$ to time $T=t_2$), in conjunction with determining an appropriate amount of time $T_{sleep}$ between sending safety messages. In other words, device 200 may determine the amount of time to turn off DSRC transceiver 256 as $T_{sleep}-\delta$. In one embodiment, device 200 may determine whether to power off DSRC transceiver 256 at all based on the minimum amount of time needed to effect a power savings in device 200, $T_{min}$. In other words, if $T_{min} > (T_{sleep}-\delta)$, device 200 may not power down DSRC transceiver 256 and may continue to broadcast safety messages at a rate based on $T_{sleep}$.

Device 200 may adjust its safety message broadcast rate by determining a new value for $T_{sleep}$ during which device 200 does not transmit safety messages. In doing so, device 200 may conserve power by transmitting fewer safety messages when not needed and, in some cases, fully powering down DSRC transceiver 256. In general, device 200 may make the adjustment based on whether or not the device is within or approaching an action zone. In other words, device 200 may broadcast safety messages at a rate lower than its maximal broadcast rate when device 200 is located outside of an action zone. In some cases, the amount of broadcast rate reduction may be limited by a minimal broadcast rate imposed on device 200.

Device 200 may determine $T_{sleep}$ in a number of different ways based on: 1.) the location and movement of device 200 (e.g., the speed, direction, etc., of device 200), 2.) historical information regarding the movement patterns of device 200 in the current geographical area, 3.) map information for the geographical area, 4.) the current and prior values of $T_{sleep}$, and/or 5.) other relevant information, such as whether device 200 is inside a building or vehicle. As noted above, device 200 may receive some or all of this information from external sources via network interface(s) 210, DSRC transceiver 256, and/or GPS receiver 258. For example, device 200 may receive information from a wearable device associated with the user of device 200 that tracks the movement of the user, the type of activities the user is performing (e.g., jogging along a trail, etc.), the vital signs of the user, etc., which device 200 may use to refine the estimation of the future location of the user and device 200. In another example, device 200 may determine that it is currently located within a vehicle based on one or more messages received by device 200 from the collision avoidance system of the vehicle.

Two basic scenarios exist with respect to an action zone. In the first scenario, there may be no clear path of travel for device 200 and its corresponding user to an action zone. For example, device 200 may be currently located within the user's house, a shopping mall, or the like, and is not moving towards an action zone. In another example, device 200 may be moving in a direction directly away from any action zones. In the second scenario however, device 200 may be approaching an action zone or may already be located within an action zone. For example, as shown in FIG. 1, user 110 and portable electronic device 112 may be within an action zone, as user 110 walks across crosswalk 114.

In the first scenario in which device 200 is not in an action zone and is not moving towards an action zone, device 200 may determine $T_{sleep}$ based on prior values of $T_{sleep}$, in some embodiments. In one embodiment, device 200 may determine the next $T_{sleep}$ value using a stochastic model. For example, device 200 may determine $T_{sleep}$ by using a time series model such as an autoregressive integrated moving average (ARIMA) model based on the correlation between past and present values of $T_{sleep}$ in the same geographical area. For example, if the user has traveled the same path multiple times, device 200 may use a history of $T_{sleep}$ values to determine the next $T_{sleep}$ value to use. In another embodiment, device 200 may use the Weiner process to determine the next $T_{sleep}$ value. Generally speaking, the Weiner process predicts the next value of a stochastic process based on its most recent past value and statistics derived from its past recent samples.

In the scenario in which device 200 is determined to be approaching an action zone (e.g., based on the direction of travel of device 200 and any available paths to the action zone from map data), device 200 may instead base $T_{sleep}$ on the current conditions of device 200 and its surroundings (e.g., the current location of device 200, the current speed and direction of device 200, inputs from any wearable devices, prior movements of device 200 along the current path, etc.). Device 200 may use such information to predict the time at which device 200 is expected to reach the action zone and base $T_{sleep}$ on the estimated arrival time.

Based on the predicted $T_{sleep}$ in either scenario, device 200 may then halt its broadcasting of safety messages for $T_{sleep}$ amount of time. In further embodiments, device 200 may also determine whether or not to disable its message transceiver (e.g., DSRC transceiver 256, etc.) for a period of time during $T_{sleep}$. For example, if DSRC transceiver 256 requires at least $\delta$ amount of time to power back on after being powered off, device 200 may determine whether a power savings would result from deactivating DSRC transceiver 256 during the broadcast sleep period. In particular, if $T_{sleep} > \delta$ and powering down DSRC transceiver 256 for $T_{sleep}-\delta$ would conserve power, then device 200 may power down DSRC transceiver 256 for $T_{sleep}-\delta$ amount of time. In other words, device 200 may power down DSRC transceiver 256 for $T_{sleep}-\delta$ amount of time or less, if $(T_{sleep}-\delta) \geq T_{min}$.

Device 200 may begin a timer when performing power conservation measures, to time when to turn back on DSRC transceiver 256 and resume sending safety messages, in some embodiments. For example, such a timer may be set as $T_{sleep}-\delta$ and, after expiration of the timer, power up DSRC transceiver 256 and begin sending safety messages again. At this time, device 200 may recalculate how far device 200 is to any action zones and use the results to recalibrate the estimation model used to predict the next value of $T_{sleep}$.

According to some embodiments, device 200 may operate its location-determining mechanism (e.g., GPS receiver 258, etc.) in a manner similar to that of DSRC transceiver 256. For example, assume that GPS receiver 258 is disabled on device 200 or is not otherwise used by other processes of device 200. In such a case, device 200 may activate and deactivate GPS receiver 258 in a manner similar to that of DSRC transceiver 256 to support its collision avoidance functions and potentially conserve power.

Figure 4:
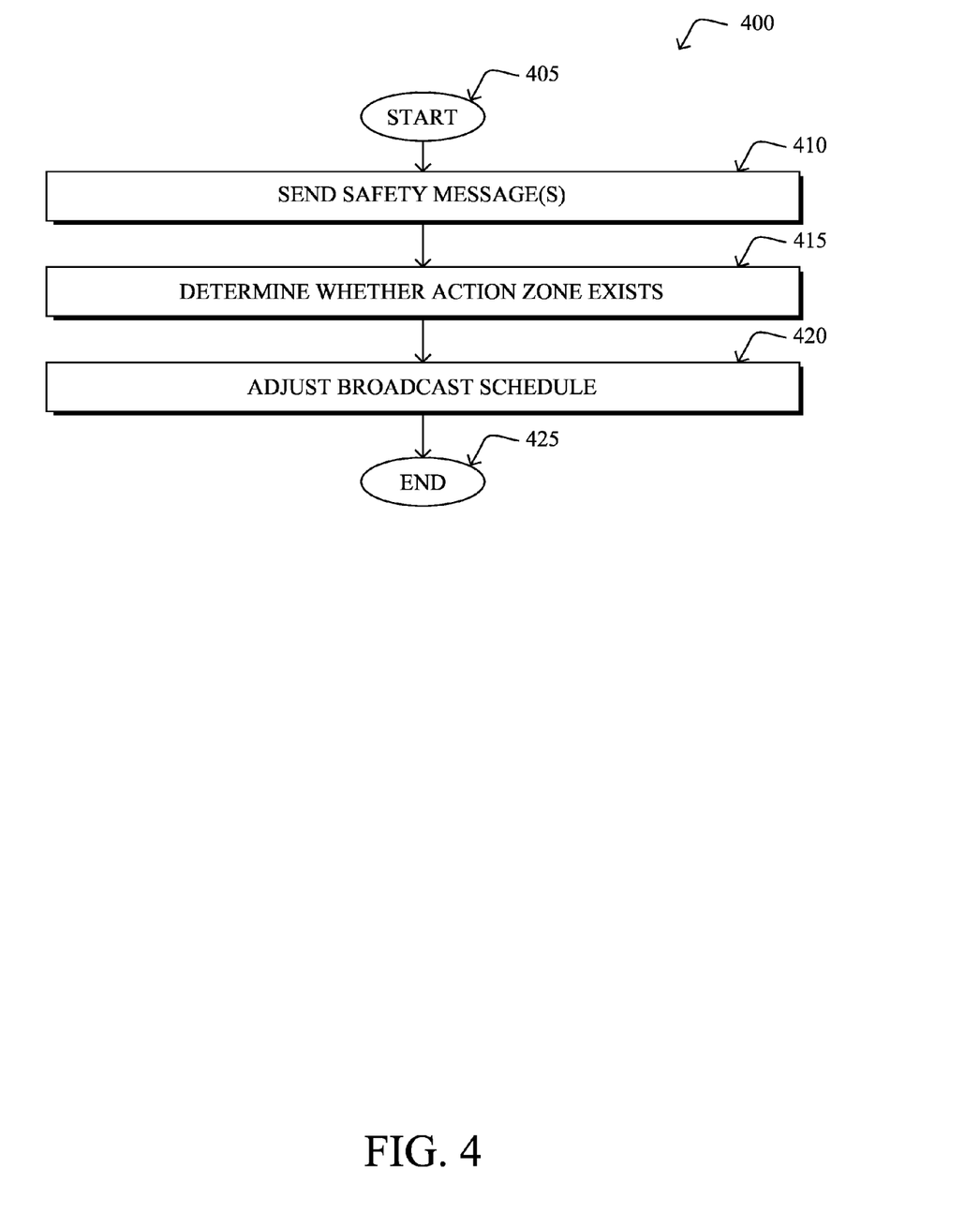
FIG. 4 illustrates an example simplified procedure for adjusting a safety message broadcast rate of a collision avoidance system.

FIG. 4 illustrates an example simplified procedure for adjusting a safety message broadcast rate in a collision avoidance system, according to various embodiments. Procedure 400 may be performed, in some implementations, by a device configured to perform collision avoidance functions. For example, procedure 400 may be performed by the device 200 described above. Procedure 400 may begin at step 405 and proceed on to step 410 where, as described in greater detail above, the device may broadcast one or more collision avoidance safety messages.

In some cases, the device may determine the location and/or movement of the device (e.g., the direction of travel of the device, the speed of travel of the device, etc.). For example, the device may use GPS data, triangulation data, or the like, to determine the current location of the device. In various embodiments, the device may determine the movement of the device based on a difference in device locations over time, sensor data (e.g., from an accelerometer, a speedometer, etc.), map data, combinations thereof, or the like.

In one embodiment, the device may send one or more safety messages at an adjustable broadcast rate. In one embodiment, the DSRC transceiver of the device may initially be powered on each time the device is activated. In response to the transceiver being powered, the device may immediately transmit one or more collision detection safety messages that include the location and movement determined by the device. At this time, the device may also scan for any safety messages sent by collision detection systems/devices in the nearby area. In one embodiment, the device may initially send the one or more safety messages at a maximum safety message broadcast rate, $R_{max}$. If the device later determines that it is safe to do so, the device may decrease its safety message broadcast rate, to help conserve power.

At step 415, the device may determine whether an action zone exists relative to the current and/or predicted future location of the device, as described above. In other words, the device may determine whether or not the current location or predicted future location of the device intersects an action zone. In various embodiments, the decision may be based in part on the distance and/or expected time of arrival of the device within a potential region of danger for the user of the device. For example, an action zone may correspond to a roadway, railway, or any other geographic area in which a collision between a vehicle and the user of the device may occur. In some embodiments, an action zone may also include an area surrounding a roadway, railway, etc. For example, the device may determine that an action zone exists ahead of the device, if the device is $D_{Action}$ meters away from any roadways or other geographic region in which vehicles may be present. In one embodiment, the device may determine that an action zone exists relative to the predicted future location of the device based in part on the determined movement of the device. For example, the device may determine that an action zone exists based on the actual or expected direction of travel of the device (e.g., based on a history of locations of the device, based on map data, etc.) and/or an estimated time of arrival of the device within the zone.

At step 420, as detailed above, the device may adjust its safety message broadcast rate based on the determination made in step 415. In general, the device may adjust its safety message broadcast rate based on the level of risk presented to the user of the device. In other words, if no action zones are impending, and the device is not currently located in an action zone, the device may lower its broadcast rate to conserve power. Conversely, the device may increase its safety message broadcast rate as the device approaches an action zone or maximize its broadcast rate if the device is currently located in an action zone.

If the device determines that an action zone does exist relative to the current or predicted future location of the device, the device may still take some power conservation measures. For example, if the device does not receive any safety messages from other devices within a predefined time interval, the device may still reduce its safety message broadcast rate to a percent of its current safety message broadcast rate R, unless such a reduction will reduce the data rate below a minimum broadcast rate, $R_{min}$.

However, if the device determines that an action zone does exist relative to the current or predicted future location of the device and the device receives one or more safety messages from another collision avoidance system (e.g., from a vehicle) associated with the action zone, the device may decrease its use of power saving measures by increasing its safety message broadcast rate. In one embodiment, the device may disable its power savings measures entirely (e.g., by increasing its safety message broadcast rate to be $R_{max}$). In another embodiment, the device may progressively increase its safety message broadcast rate based on the information conveyed in the one or more safety messages received by the device. For example, the device may increase its safety message broadcast rate as the likelihood of a collision with the device increases (e.g., based on the movement of the vehicle relative to the device and vice-versa). However, if the likelihood of collision decreases (e.g., the vehicle begins to slow down, the user of the device changes directions, etc.), the device may decrease its safety message broadcast rate, accordingly. According to various embodiments, the device may also take other power conservation measures such as powering off its DSRC transceiver, powering off its GPS receiver, etc., based on the determination made in step 415. Procedure 400 then ends at step 425.

Figure 5:
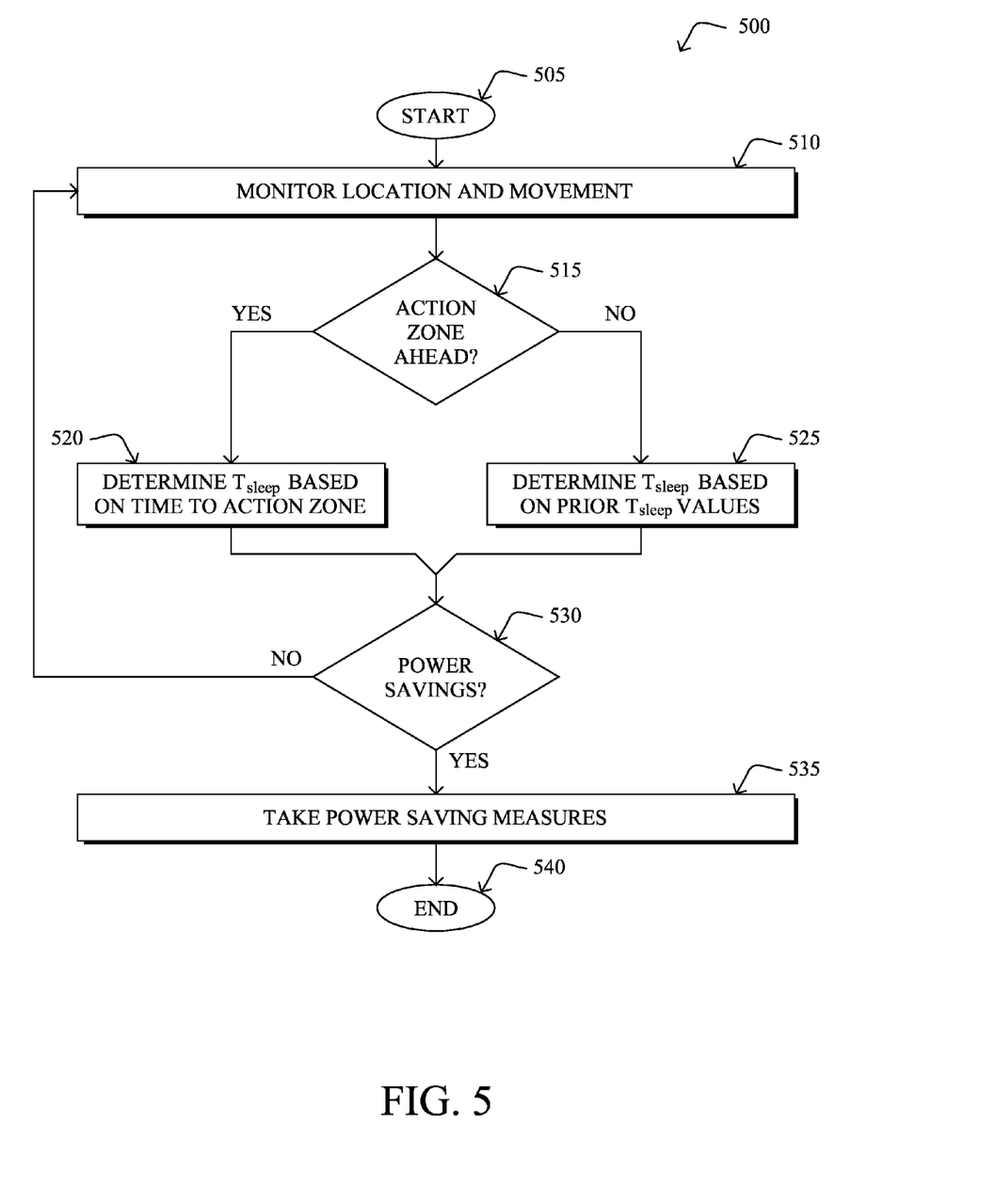
FIG. 5 illustrates an example simplified procedure for conserving power in a collision avoidance system.

Referring now to FIG. 5, an example simplified procedure for conserving power in a collision avoidance system is shown, according to various embodiments. The procedure 500 may be performed by an electronic device configured to perform vehicle collision avoidance functions, such as device 200 described above. The procedure 500 may begin at step 505 and continue on to step 510 where the device may monitor the location and/or movement of the device. Assume for purposes of illustration that location data is always available to the device performing procedure 500. For example, the GPS receiver of the device may always be active, cellular triangulation may be available to locate the device, etc. In some embodiments, the device may store a history of the monitored device locations, to determine the movement of the device (e.g., direction and/or speed of travel of the device, etc.). For example, the device may divide the distance between locations by the change in time between the locations, to determine the speed at which the device is traveling. In another example, the device may use linear regression or another modeling technique, to determine the direction of travel of the device. In one embodiment, the device may also use map data, to determine the likely direction of travel of the device and corresponding user of the device (e.g., if there exists an upcoming curve, obstruction, etc.).

At step 515, the device may determine whether an action zone is upcoming, based on the monitored location and movement of the device, as described in greater detail above. For example, such as in the context of a portable electronic device operated by a pedestrian, an action zone may correspond to a roadway, railway, trolley line, or other pathway in which vehicles are likely to be present.

In some cases, an action zone may be based in part on the mode of transportation taken by the user of the device. For example, assume that the user is located in the middle of a roadway, but is currently riding a bus or other motor vehicle. Were the user a pedestrian at the same location, the device may determine that the roadway is an action zone. However, since the user is currently in a moving vehicle, the roadway may not be an actual action zone for the device. In one embodiment, the device may determine that its user is riding in a motor vehicle based on one or more messages (e.g., safety messages, etc.) received from the collision avoidance system of the vehicle and use this information to determine that the roadway is not a current action zone for the device.

If the device determines that an action zone exists in step 515, the device may determine a corresponding amount of sleep time for its safety message broadcasts based on the parameters associated with the action zone, as shown in step 520. By adjusting its safety message sleep time, the device may also adjust its safety message broadcast rate (e.g., increasing the amount of sleep will decrease the broadcast rate and vice-versa). In one embodiment, the amount of sleep $T_{sleep}$ between safety message broadcasts may be based in part on an estimated amount of time for the device to reach the action zone. For example, the device may use the current speed and location of the device and/or any nearby vehicles, to determine how long it will take before the device and/or nearby vehicles reach the action zone.

The device may use any number of different techniques to increase or decrease its safety message broadcast rate, in response to changing distances between the device, any nearby vehicles, and/or the action zone. In one embodiment, assume that the closest approaching vehicle is currently D meters away from the device and this vehicle is expected to travel at a maximum speed of S meters per second. In such a case, if the device is to send at least k-number of messages to the vehicle before the vehicle approaches the device in the action zone, then the device needs to broadcast its safety messages at a rate that is at least (k*S)/D. As the likelihood of a collision varies (e.g., based on the speeds of the device and vehicle, the distance D between the device and vehicle, etc.), the device may increase or decrease its safety message broadcast rate, accordingly.

If the device determines that an action zone does not exist in step 515, procedure 500 may continue on to step 525 where the device may determine a sleep time for its safety message broadcasts based on a history of sleep times used by the device (e.g., within the same geographic area). In various embodiments, the device may use modeling techniques to estimate the sleep time $T_{sleep}$ the device may experience before moving back into range of an action zone. Example modeling techniques may include, for example, stochastic modeling techniques, Bayesian techniques, clustering techniques, or other such predictive techniques to estimate how long it will be before the device is likely to encounter an action zone.

At step 530, the device may determine whether the amount of sleep determined by the device in step 520 or 525 will result in a power savings for the device, as described above. In particular, the device may determine whether $T_{sleep}$ determined in step 520 or 525 is below $T_{min}$, the minimum of sleep that would result in a power savings in the device (e.g., by powering off its DSRC transceiver). For example, as described with respect to FIG. 3, the device may determine whether $(T_{sleep}-\delta)<T_{min}$, where $\delta$ is the amount of time needed to power up the transceiver before resuming broadcasting.

If the device determines in step 530 that the adjusted safety message broadcast rate and corresponding power saving measures (e.g., based on $T_{sleep}$ from step 520 or 525) would not result in a power savings, procedure 500 may return to step 510. Notably, the device may reject the adjustment to its safety message broadcast rate (and functioning of its DSRC receiver, etc.) and continue to use its current broadcast rate.

However, if the device determines in step 530 that the adjusted safety message broadcast rate (e.g., based on $T_{sleep}$ from step 520 or 525) would result in a power savings, procedure 500 may instead continue on to step 535 where the device may take the corresponding power savings measures. In one embodiment, the device may halt broadcasting safety messages for $T_{sleep}$ amount of time, to conserve power. In another embodiment, the device may also disable its safety message transceiver (e.g., a DSRC transceiver, etc.), to further conserve power. In another embodiment, the device may also disable its GPS receiver, to conserve power. Procedure 500 then ends at step 540.

Figure 6:
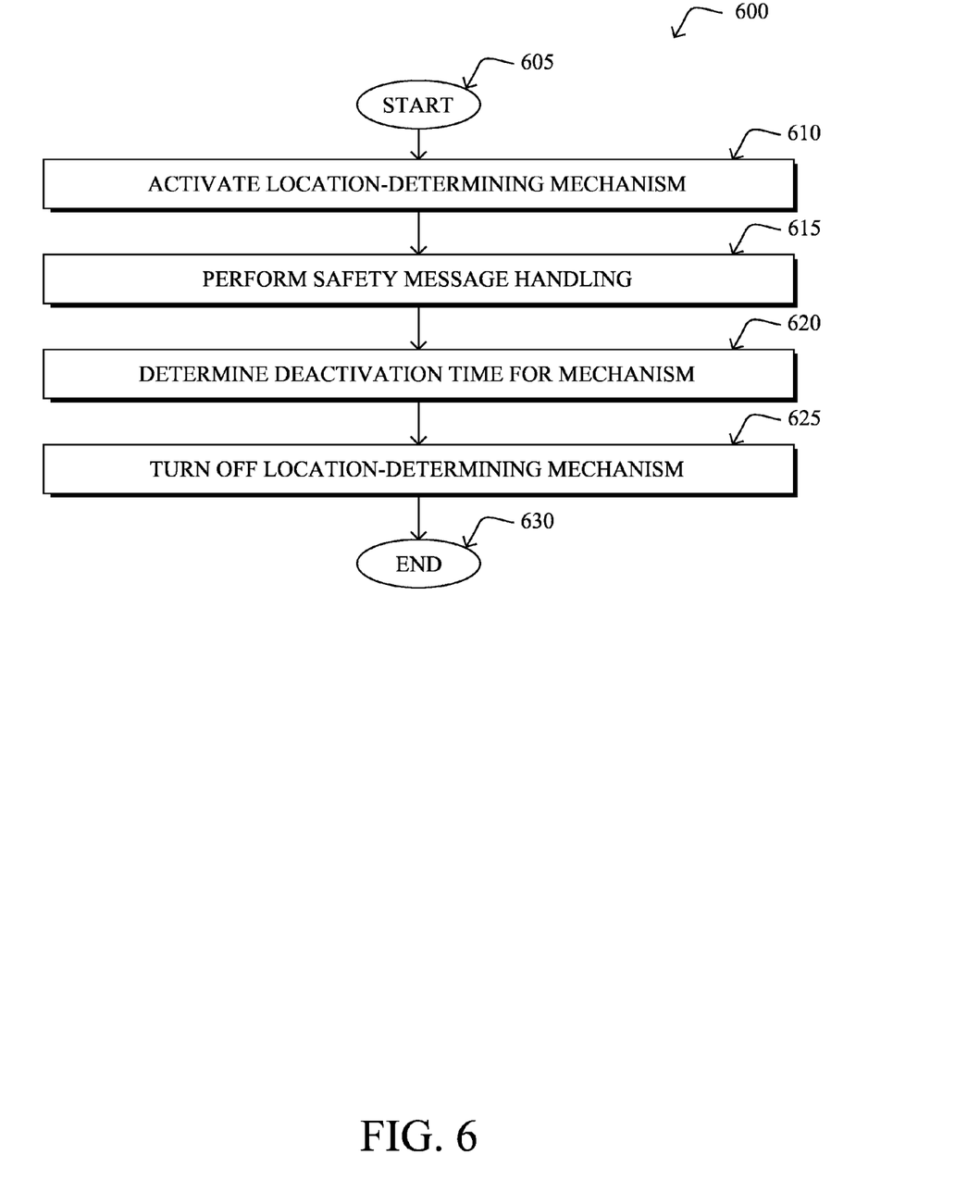
FIG. 6 illustrates an example simplified procedure for operating a location-determining mechanism of a collision avoidance system.

Referring now to FIG. 6, an example simplified procedure is shown for operating a location-determining mechanism of a collision avoidance system, according to various embodiments. In some situations, the user of a portable electronic device may disable the GPS receiver or other location-determining mechanism of the device. In such cases, the device (e.g., device 200) may perform procedure 600, to continue to support its collision avoidance functions. As shown, procedure 600 may begin at step 605 and continue on to step 610 where, as described in greater detail above, the device may activate or otherwise turn on its GPS receiver or other location-determining mechanism. In some embodiments, the device may activate its location-determining mechanism from time to time, to determine the current location of the device. Based on the determined location, the device may use the location information to also determine whether the device is within an action zone or otherwise approaching an action zone.

At step 615, as detailed above, the device may perform safety message handling, in conjunction with activating its location-determining mechanism in step 610. For example, during or after the device activates its GPS receiver, the device may also send out one or more safety messages and listen for any safety messages from nearby vehicles, as detailed above. Notably, if the device is using the power conservation techniques herein, the device may power on its DSRC transceiver in conjunction with its GPS receiver, to perform its collision avoidance functions.

At step 620, the device may determine an amount of deactivation time during which its location-determining mechanism may be deactivated. Such a determination may be based in part on the current and/or projected location of the device. For example, if the device is currently located within an action zone, the device may postpone this determination until the device leaves the action zone. In various embodiments, the device may determine the deactivation time for its location-determining mechanism in a similar manner as that of its safety message handling mechanism (e.g., its DSRC transceiver, etc.), as described in greater detail above.

When the device is no longer inside any action zone, the device may use stochastic models or other predictive techniques to predict the time duration $T_{OFF}$ during which the location-determining mechanism of the device may be deactivated. $T_{OFF}$ may be estimated such that during the next $T_{OFF}$ time units, the device will have a negligible chance of moving into any start-up zone. In general, a start-up zone may be any area within $D_{Start-Up}$ meters of any roadway or other action zone, where $D_{Start-Up} \geq D_{Action}$. In other words, the device may reactivate its GPS receiver or other location-determining mechanism before reaching any action zone. In doing so, this ensures that the device will not move into an action zone before reactivating its collision avoidance functions.

At step 625, the device may deactivate or otherwise turn off its location-determining mechanism for the amount of deactivation time determined in step 620. Procedure 600 then ends at step 630. In some embodiments, the device may repeat procedure 600 any number of times, to continually power up its location-determining mechanism, perform its collision avoidance functions, and power down its location-determining mechanism, to help conserve power.

It should be noted that while certain steps within procedures 400-600 may be optional as described above, the steps shown in FIGS. 4-6 are merely examples for illustration, and certain other steps may be included or excluded as desired. Further, while a particular order of the steps is shown, this ordering is merely illustrative, and any suitable arrangement of the steps may be utilized without departing from the scope of the embodiments herein. Moreover, while procedures 400-600 are described separately, certain steps from each procedure may be incorporated into each other procedure, and the procedures are not meant to be mutually exclusive.

The techniques described herein, therefore, allow smartphones or other portable devices to perform collision avoidance functions. For example, such a device may be operable to broadcast safety messages to vehicles and to receive safety messages from the vehicles, to help avoid vehicle-pedestrian collisions. In further aspects, power conservation techniques are disclosed herein that allow the collision avoidance functions of the device to reduce their power consumptions.

While there have been shown and described illustrative embodiments that provide for power conservation in collision avoidance systems, it is to be understood that various other adaptations and modifications may be made within the spirit and scope of the embodiments herein. For example, the embodiments have been shown and described herein with relation to mobile devices intended to be carried on or with an individual. However, the embodiments in their broader sense are not as limited, and may, in fact, be used with other types of devices, such as those onboard a vehicle. In addition, while certain protocols are shown, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
 sending, by a device, collision avoidance safety messages to prevent potential collisions between vehicles and the device;
 determining, by the device, whether a current or predicted future location of the device intersects an action zone, wherein an action zone corresponds to a geographic area in which a potential collision may occur between a vehicle and the device;
 adjusting, by the device, a broadcast rate for the collision avoidance safety messages based on whether the device determines that the current or predicted future location of the device intersects an action zone, wherein adjusting the broadcast rate for the collision avoidance safety messages comprises:
  determining, by the device, a broadcast sleep period of time during which the device does not send collision avoidance safety messages based on whether the device determines that the current or predicted future location of the device intersects an action zone; and
  determining, by the device, an off period of time for a radio transceiver of the device based on the broadcast sleep period and an amount of time needed for the transceiver to power back on, wherein the device uses the radio transceiver to send the collision avoidance safety messages.

2. The method as in claim 1, wherein adjusting the broadcast rate for the collision avoidance safety messages comprises:
 sending the collision avoidance safety messages at a set maximum broadcast rate based on the device determining that the current location of the device intersects an action zone.

3. The method as in claim 1, wherein adjusting the broadcast rate for the collision avoidance safety messages comprises:
 decreasing the broadcast rate for the collision avoidance safety messages sent by the device, in response to a determination that the device has not received a safety message from a vehicle in a particular action zone.

4. The method as in claim 1, wherein the device determines that the device is approaching a particular action zone, and wherein the method further comprises:
 determining the broadcast sleep period of time based on an estimated time of arrival of the device at the particular action zone.

5. The method as in claim 1, further comprising:
 determining the broadcast sleep period of time using a stochastic model based on one or more prior sleep periods previously used by the device, in response to a determination that the current and predicted future locations of the device do not intersect an action zone.

6. The method as in claim 5, wherein the stochastic model comprises an autoregressive integrated moving average (ARIMA) model.

7. The method as in claim 1, further comprising:
 powering down the radio transceiver during the off period of time, in response to a determination that the off period of time for the radio transceiver will result in a power savings for the device.

8. The method as in claim 1, further comprising:
 powering the radio transceiver during the determined broadcast sleep period, in response to a determination that the off period of time for the radio transceiver will not result in a power savings for the device.

9. The method as in claim 1, further comprising:
 powering on, by the device, a location-determining mechanism of the device;
 performing, by the device, safety message handling while the location-determining mechanism is powered;
 determining, by the device, a deactivation time period for the location-determining mechanism based on the broadcast sleep period; and
 powering down, by the device, the location-determining mechanism of the device during the determined deactivation time period for the location-determining mechanism.

10. An apparatus, comprising:
 a radio transceiver to send and receive collision avoidance safety messages;
 a processor coupled to radio transceiver and configured to execute one or more processes; and
 a memory configured to store a process executable by the processor, the process when executed operable to:
  send collision avoidance safety messages via the radio transceiver to prevent potential collisions between vehicles and the apparatus;
  determine whether a current or predicted future location of the apparatus intersects an action zone, wherein an action zone corresponds to a geographic area in which a potential collision may occur between a vehicle and the apparatus;
  adjust a broadcast rate for the collision avoidance safety messages based on whether the apparatus determines that the current or predicted future location of the apparatus intersects an action zone, wherein the apparatus adjusts the broadcast rate for the collision avoidance safety message by:
  determining a broadcast sleep period of time during which the device does not send collision avoidance safety messages based on whether the device determines that the current or predicted future location of the device intersects an action zone; and
  determine an off period of time for a radio transceiver of the device based on the broadcast sleep period and an amount of time needed for the transceiver to power back on, wherein the apparatus uses the radio transceiver to send the collision avoidance safety messages.

11. The apparatus as in claim 10, further comprising:
  a global positioning system (GPS) receiver, wherein the current or predicted future location of the apparatus is based on location data received via the GPS receiver.

12. The apparatus as in claim 10, wherein the apparatus determines that the apparatus is approaching a particular action zone, and wherein the process when executed is further operable to:
  determine the broadcast sleep period of time based on an estimated time of arrival of the apparatus at the particular action zone.

13. The apparatus as in claim 10, wherein the process when executed is further operable to:
  determine the broadcast sleep period of time using a stochastic model based on one or more prior sleep periods previously used by the apparatus, in response to a determination that the current and predicted future locations of the apparatus do not intersect an action zone.

14. The apparatus as in claim 10, wherein the apparatus is configured to power down the radio transceiver during the determined off period of time if doing so will result in a power savings for the apparatus, and wherein the apparatus is configured to continue powering the radio transceiver during the determined off period of time if doing so will not result in a power savings for the apparatus.

15. The apparatus as in claim 10, wherein the apparatus includes a location-determining mechanism and the process when executed is further operable to:
  power on the location-determining mechanism of the apparatus;
  perform safety message handling while the location-determining mechanism is powered;
  determine a deactivation time period for the location-determining mechanism based on the broadcast sleep period; and
  power down the location-determining mechanism of the apparatus during the determined deactivation time period for the location-determining mechanism.

16. A tangible, non-transitory, computer-readable media having software encoded thereon, the software when executed by a processor of a device is operable to:
  send collision avoidance safety messages to prevent potential collisions between vehicles and the device;
  determine whether a current or predicted future location of the device intersects an action zone, wherein an action zone corresponds to a geographic area in which a potential collision may occur between a vehicle and the device;
  adjust a broadcast rate for the collision avoidance safety messages based on whether the device determines that the current or predicted future location of the device intersects an action zone, wherein the broadcast rate for the collision avoidance safety message is adjusted by:
    determining a broadcast sleep period of time during which the device does not send collision avoidance safety messages based on whether the device determines that the current or predicted future location of the device intersects an action zone; and
  determine an off period of time for a radio transceiver of the device based on the broadcast sleep period and an amount of time needed for the transceiver to power back on, wherein the device uses the radio transceiver to send the collision avoidance safety messages.

17. The tangible, non-transitory, computer-readable media as in claim 16, wherein the processor determines that the device is approaching a particular action zone, and wherein the process when executed is further operable to:
  determine the broadcast sleep period of time based on an estimated time of arrival of the apparatus at the particular action zone.

18. The tangible, non-transitory, computer-readable media as in claim 16, wherein the process when executed is further operable to:
  determine the broadcast sleep period of time using a stochastic model based on one or more prior sleep periods previously used by the apparatus, in response to a determination that the current and predicted future locations of the apparatus do not intersect an action zone.

19. The tangible, non-transitory, computer-readable media as in claim 16, wherein the process when executed is further operable to power down the radio transceiver during the determined off period of time if doing so will result in a power savings for the apparatus, and wherein the apparatus is configured to continue powering the radio transceiver during the determined off period of time if doing so will not result in a power savings for the apparatus.

20. The tangible, non-transitory, computer-readable media as in claim 16, wherein the process when executed is further operable to:
  power on a location-determining mechanism of the apparatus;
  perform safety message handling while the location-determining mechanism is powered;
  determine a deactivation time period for the location-determining mechanism based on the broadcast sleep period; and
  power down the location-determining mechanism of the apparatus during the determined deactivation time period for the location-determining mechanism.

* * * * *

UNITED STATES PATENT AND TRADEMARK OFFICE
CERTIFICATE OF CORRECTION

PATENT NO. : 9,685,086 B2
APPLICATION NO. : 14/722258
DATED : June 20, 2017
INVENTOR(S) : Tao Zhang et al.

Page 1 of 1

It is certified that error appears in the above-identified patent and that said Letters Patent is hereby corrected as shown below:

In the Specification

In Column 8, Line 12, please amend as shown:
requires at least $\delta$ amount of time to power back on after In Column 9, Line 48, please amend as shown:
broadcast rate to $\alpha$ percent of its current safety message Signed and Sealed this
Twelfth Day of January, 2021

Andrei Iancu
*Director of the United States Patent and Trademark Office*